2,787,549
PROCESSING OF FISH

Daniel J. Heald, Lowell, Mass., assignor to General Foods Corporation, White Plains, N. Y., a corporation of Delaware No Drawing. Application March 21, 1955,
Serial No. 495,813

7 Claims. (Cl. 99—111)

The present invention relates to the processing of fish and more particularly to the skinning of fish and the separation of fish flesh and bones.

In the usual commercial processing of fish other than the gutting, heading and finning, it has long been the practice to skin and fillet the fish, thus providing the consumer with a most conveniently handled and prepared product. This results, however, in much waste since the flesh which remains attached to the fish skeleton is not readily separated from the bones and, therefore, is not usually recovered, being sold as part of the so-called "gurry."

Primary objects of the present invention are to provide for the mechanical skinning of the fish and for the mechanical separation of the fish flesh from the skeleton and other fish bones. Additional objects are the recovery of the fish flesh which remains attached to the skeleton after filleting, the more economical processing of smaller fish which are not usually filleted and the elimination of filleting. These and other objects will be apparent from the discussion that follows hereinafter.

It has now been found that fish flesh can be conveniently and economically provided by a process involving the several steps and requiring the careful maintenance of the processing conditions detailed hereinafter. In brief, the process contemplates subjecting headed, gutted and finned fish to a brief heat treatment herein referred to as "blanching" and thereafter removing the skin by impinging a stream of fluid such as water under high pressure on the blanched fish carcass. The skinned carcass is then cooked to loosen the flesh from the bones and tumbled in a reel or on a vibrating screen to separate flesh and bones.

Fish which have been headed, gutted, finned and, preferably, scaled, may be blanched by briefly heating the same at an elevated temperature such as 200°–225° F. using any suitable method of heating, hot air, hot water and steam being possible alternatives. The period of such blanching depends on the size of the fish. For example, with water at 212° F., a 2 ounce fish is blanched in about 10 seconds, while a 10 ounce fish requires about 30 seconds, and a 20 ounce fish requires about 45 seconds. Longer periods are required with fish from which the scales have not been removed. Lower temperatures may be employed but necessitate longer periods of treatment. Higher temperatures may likewise be employed although temperatures considerably higher than 225° F. should be avoided since their use may cause cooking and, in any event, such higher temperatures require more exactly controlling the duration of the processing period. Also, such higher temperatures where employed should be effected by the use of moist heat to avoid any dehydration of the fish flesh. Generally, a temperature within the range of about 180°–240° F. is contemplated with the aforementioned precaution of using moist heat at the higher temperatures being observed.

After blanching the fish is subjected to a high-pressure stream of water, steam or air for the purpose of detaching and rolling back the skin which has been loosened by the blanching. The pressure of the stream is such as will loosen and roll back the skin without damaging the fish flesh. The actual pressure depends upon the variety of the fish and upon prior processing but generally is 50–100 lbs./sq. in. The stream is preferably a flat stream as wide as the fish being skinned and the relative movement of fish and stream is such that the fish is moved head first against the stream so that the skin is rolled back on the fish from the head to the tail. Generally the stream impinges on the fish at an angle of 30°–50° with respect to the longitudinal axis of the fish, an angle of 45° being preferred. But, in any case the pressure of the stream, the angle in which it impinges on the fish, and the rate of relative movement of fish and stream are all to be controlled with the objective being to roll back the skin as it is removed. Generally the fish are placed on a conveyor belt so that they proceed head first being subjected to the high pressure stream of water or steam for the purpose of skin removal. Subsequently the fish are turned over and the other side is subjected to the same treatment.

After the removal of the skin the fish are then cooked although the object in this step is not complete cooking but rather only such an amount that will bring about a loosening of the fish flesh from the bones. In fact, it is preferred to minimize the cooking effected at this point since products made from fish cooked as little as possible are preferred by the consuming public. In cooking the skinned fish by immersion in hot water it has been found that optimum results for fish weighing less than 1 pound are obtained at 212° F. using a period of 1¾ minutes, at 180° F. by cooking for a period of 2½–3 minutes and at 160° F. by cooking for a period of 3–4 minutes. When steam is employed the cooking period is somewhat longer being of the order of 4 minutes to provide best results. Other methods of cooking may also be employed such as dry heat using an oven or a dielectric heater but, of course, the wet methods are preferred from the standpoint of convenience, control and quality of product.

Separation of the fish flesh from the bones is effected by a jarring action such as is provided by a perforated reel or a vibrating screen. Such a reel should be of non-circular cross-section, a rectangular, hexagonal or octagonal reel being preferred. The dimensions and pitch of the reel and its rate of revolution are not of critical importance so long as sufficient jarring action to provide separation of flesh and bones is provided.

Generally, the rate with which the reel is turned should be such as to lift the fish about half way up to the top of the reel so that its fall to the bottom is sharp but not severe. The jarring action resulting from the fish falling to the bottom of the reel results in loosening the flesh from the bones. The flesh falls through holes contained in the sides of the reel, the aggregate of the area of the holes equalling substantially that of the solid portion of the sides of the reel. In the course of its travel through the reel the fish carcass is subjected to at least 3–6 tumbling actions of this kind. In this manner the fish carcasses proceed through the reel and the skeletons are discharged at the end thereof substantially free of fish flesh. All bones, however, are not discharged at the end of the reel but instead some go through the aforementioned holes along with the fish flesh, some of this resulting from bones being jarred loose from the skeletons but also some being unavoidable because of the so-called "floating" bones contained in the fish.

In addition to using a reel such as that described above, the initial separation of bones and fish meat can be effected by means of an inclined vibrating screen. The flaked fish meat which is jarred loose from the fish bones as a result of the vibration falls through the openings in the screen as the fish carcass moves from the upper end to the lower end of the screen, the skeletons being discharged at the lower end of the screen.

The bones contained in the fish flakes may be removed by hand or by any other suitable method such as gravity separation using, for example, brine having a specific gravity of about 1.075–1.086 in which the fish flakes or flesh float and the bones sink to the bottom. The flesh is recovered, well rinsed with water and further inspected for any faults. The brine of the aforementioned specific gravity contains from 11 to 12% salt and has a Salometer reading of 43–45.

A detailed example of the process of the present invention as applied to whole fish of about the 10 ounce size follows:

The gutted, headed, finned and scaled fish are deposited head first on a traveling screen-conveyor which carries the fish through a steam chamber, the period of travel within said steam chamber being about 30 seconds. The steam chamber is a horizontal, rectangular enclosure of about 30 feet in length and slightly wider than the conveyor. Inside and running the length of the enclosure is a series of perforated steam pipes providing steam jets along the entire length of the enclosure. Narrow openings at either end of the chamber permit the screen-conveyor together with the fish being conveyed to pass through the steam chamber without excessive loss of steam.

After emerging from the steam chamber the fish encounter high-pressure streams of water at about 180° F. and under a pressure of about 50 lbs./sq. in. The water streams are at an angle of 45° with respect to the horizontal. Each stream or bank of streams extends across the width of the screen-conveyor. A succession of about a dozen of such streams are employed with fish of about the 10 ounce size. The action of the streams removes the half of the skin from the upper side of the fish. Thereafter, the fish are allowed to fall off the end of the screen-conveyor onto another screen-conveyor going in the opposite direction and the fish then encounter another series of high-pressure water sprays such as those aforementioned which serve to remove the other half of skin. From there the fish are conveyed to a cooker which comprises a long narrow tank filled with boiling water and through which the fish are conveyed, being in the cooker only about 1¾ minutes.

The cooked fish are then conveyed to a tumbling reel of octagonal cross-section, about 10 feet long and one yard in diameter, revolving at a rate of about 35 R. P. M., there being evenly spaced 1 inch diameter holes in the sides of the reel, said holes being sufficient in number so that the aggregate of the area of the holes equals that of the remaining solid portion of the sides of the reel. As a result of the tumbling action of the reel the fish meat is dislodged from the fish skeletons, the meat falling through the holes in the sides of the reel and the skeletons and larger bones being discharged at the other end of the reel.

Some bones, especially the smaller ones and the so-called "floating" bones are not separated from the fish meat. Such bones are separated from the fish meat by means of a gravity separation, using brine having a specific gravity of 1.80, the fish meat floating at the top of the brine and the bones sinking to the bottom. The fish meat is recovered, washed with water and is ready for further processing as in the production of frozen slabs for fish stick production.

It will be understood that while the invention has been described in part by means of a specific example reference should be had to the appended claims for a definition of the scope of the invention.

What is claimed is:

1. The processing of headed, gutted, and finned fish including briefly heating the fish at a temperature of about 180°–240° F. for a time sufficient to loosen the skin, said heating time being about ten seconds for scaled small fish and about forty-five seconds for scaled fish weighing about twenty ounces, impinging a high-pressure fluid stream on the side of the fish at an angle within the range of 30°–50° with respect to the longitudinal axis of the fish to roll back the skin, cooking the fish sufficiently to loosen the fish flesh from the fish bones, said cooking being about 1¾ minutes at 212° F., 2½–3 minutes at 180° F., and 3–4 minutes at 160° F. for fish weighing up to one pound cooked by immersion in water, jarring the fish to detach said flesh from said bones and separating flesh and bones by screening.

2. The processing of headed, gutted, and finned fish including briefly heating the fish at a temperature of about 180°–240° F. for a time sufficient to loosen the skin, said heating time being about ten seconds for scaled small fish and about forty-five seconds for scaled fish weighing about twenty ounces, conveying the fish horizontally and head first against a high-pressure fluid stream impinging at an angle within the range of 30°–50° with respect to the horizontal to roll back the skin, cooking the fish sufficiently to loosen the fish flesh from the fish bones, said cooking being about 1¾ minutes at 212° F., 2½–3 minutes at 180° F., and 3–4 minutes at 160° F. for fish weighing up to one pound cooked by immersion in water, jarring the fish to detach said flesh from said bones and separating flesh and bones by screening.

3. The processing of headed, gutted, and finned fish including heating the fish at a temperature within the range of about 180°–240° F. to loosen the skin, the period of such heating being shorter at the higher temperatures and with the smaller fish and varying from about ten seconds for scaled small fish to about forty-five seconds for scaled fish weighing about twenty ounces, conveying the fish horizontally and head first against a high-pressure fluid stream impinging at an angle of about 45° with respect to the horizontal to roll back the skin, cooking the fish sufficiently to loosen the fish flesh from the fish bones, said cooking being about 1¾ minutes at 212° F., 2½–3 minutes at 180° F., and 3–4 minutes at 160° F. for fish weighing up to one pound cooked by immersion in water, jarring the fish to detach said flesh from said bones and separating flesh and bones by screening.

4. The skinning of headed, gutted, and finned fish including briefly heating the fish at a temperature of about 180°–240° F. for a time sufficient to loosen the skin, said heating time being about ten seconds for scaled small fish and about forty-five seconds for scaled fish weighing about twenty ounces, impinging a high-pressure fluid stream on the side of the fish at an angle within the range of 30°–50° with respect to the longitudinal axis of the fish to roll back the skin.

5. The skinning of headed, gutted, and finned fish including briefly heating the fish at a temperature of about 180°–240° F. for a time sufficient to loosen the skin, said heating time being about ten seconds for scaled small fish and about forty-five seconds for scaled fish weighing about twenty ounces, conveying the fish horizontally and head first against a high-pressure fluid stream impinging at an angle within the range of 30°–50° with respect to the horizontal to roll back the skin.

6. The skinning of headed, gutted, and finned fish including heating the fish at a temperature within the range of about 180°–240° F. to loosen the skin, the period of such heating being shorter at the higher temperatures and with the smaller fish and varying from about ten seconds for scaled small fish to about forty-five seconds for scaled fish weighing about twenty ounces, conveying the fish horizontally and head first against a high-pressure fluid stream impinging at an angle of about 45° with respect to the horizontal to roll back the skin.

7. The processing of headed, gutted, finned, and skinned fish to separate fish flesh from fish bones including cooking the fish sufficiently to loosen the fish flesh from the fish bones, said cooking being about 1¾ minutes at 212° F., 2½–3 minutes at 180° F., and 3–4 minutes at 160° F. for fish weighing up to one pound cooked by immersion in water, and jarring the fish to detach said flesh from said bones and separating flesh and bones by screening.

References Cited in the file of this patent

UNITED STATES PATENTS

| | | |
|---|---|---|
| 1,970,308 | Hopkinson | Aug. 14, 1934 |
| 2,453,625 | Harrison | Nov. 9, 1948 |